(No Model.)

J. A. KIRK.
VEGETABLE CUTTER.

No. 340,884. Patented Apr. 27, 1886.

WITNESSES:
Jos. H. Blackwood
W. M. Doolittle

INVENTOR:
Joseph A. Kirk
by R. G. DuBois
his Attorney

UNITED STATES PATENT OFFICE.

JOSEPH ALOYSIUS KIRK, OF PITTSBURG, PENNSYLVANIA.

VEGETABLE-CUTTER.

SPECIFICATION forming part of Letters Patent No. 340,884, dated April 27, 1886.

Application filed October 28, 1885. Serial No. 181,143. (No model.)

*To all whom it may concern:*

Be it known that I, JOSEPH ALOYSIUS KIRK, a citizen of the United States, residing at Pittsburg, in the county of Allegheny and State of Pennsylvania, have invented certain new and useful Improvements in Vegetable-Cutters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention consists in an improved machine for cutting and slicing vegetables, and more particularly for cutting and slicing cabbage preparatory to making sauer-kraut or slaw therefrom.

The improved cutter or slicer consists, essentially, in a base-board provided with cutting-knives, which board is adapted to be clamped over a receiving-receptacle; in a sliding box adapted to contain the vegetable to be cut, which slides upon said base-board, thus bringing the vegetable in contact with the knives, and in a feeding presser-plate, a plunger within the box which presses the vegetables down against the knives, the feeding presser-plate or plunger being operated by the same handle which is utilized to reciprocate the sliding box.

Figure 1:
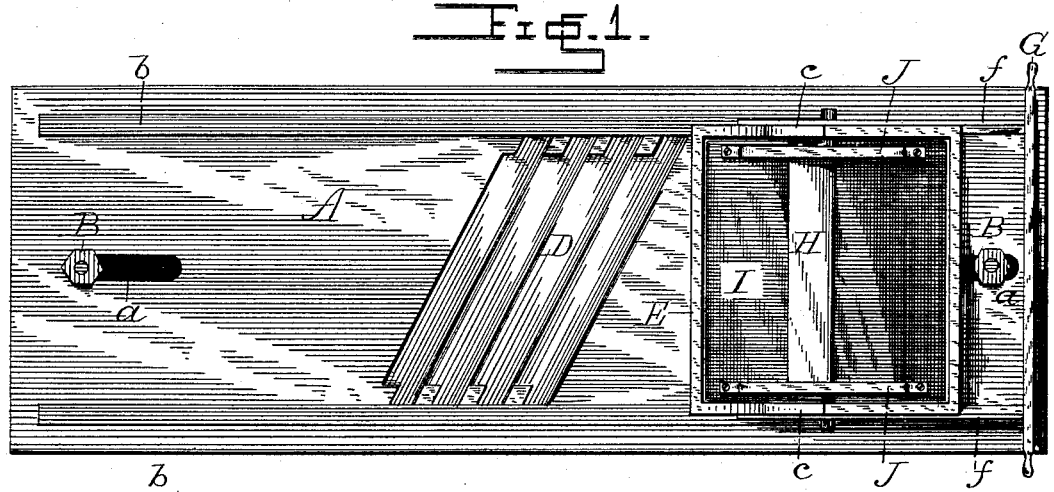
Figure 2:
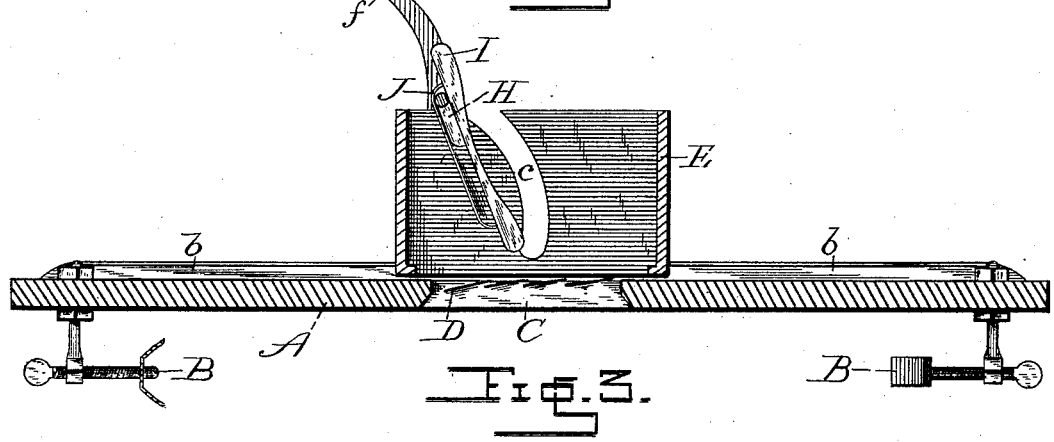
Figure 3:
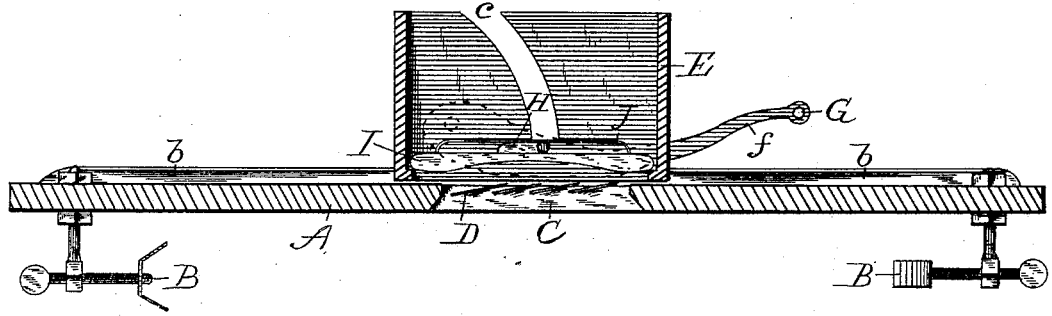

In the accompanying drawings, Figure 1 is a plan view of my improved cutter or slicer. Fig. 2 is a vertical longitudinal section thereof, showing the sliding box in position for receiving the vegetables to be sliced or cut; and Fig. 3 is a similar section showing the parts in operative position.

Like letters designate corresponding parts in all of the figures.

The base-plate A is secured to any suitable receiving-receptacle by means of screw-clamps B, which, in order to adapt the base-plate to any size of receiving-vessel, are adjustable along the base-plate by being secured in longitudinal slots $a$ $a$, made in the bottom of the plate. The base-plate is provided at its center with a suitable discharge-aperture, C, across which the cutting or slicing knives D D are secured. The knives are preferably arranged in an angular position across the aperture C, as shown, in order that the vegetables may be cut by a shear instead of a square cut, thus rendering the operation more easy and effective.

The base-plate on its upper face is provided with longitudinally-extending guide-strips $b$ $b$, between which the sliding vegetable-box E is reciprocated. In this box the vegetables to be sliced are placed, and by sliding the box back and forth across the knives the vegetables are cut, the sliced portions falling through the aperture C into the receptacle beneath. In order, however, to make the cutting a continuous operation a downward pressure must be constantly applied to the vegetables within the box, in order at all times to bring the vegetables into contact with the knives. To effect this result I adopt the following mechanism: Pivoted to the outer sides of the box, near one end thereof, are two lever-arms, F F, connected at their free ends by a cross-handle, G. This handle is adapted to be swung down behind the box, as shown in Fig. 3, and constitutes the handle by which the box is reciprocated upon the base-plate. Between the pivotal points of the lever-arms and the handle G a flat cross-bar, H, is rotatively mounted in bearings formed in the lever-arms. When the lever-arms are in a vertical position, as shown in Fig. 2, the ends of bar H are just above the upper edges of the box, and when the lever-arms are depressed, the ends of the bar H pass downward through arc-shaped slots $c$ $c$, cut in the sides of the box. When the bar H reaches the bottoms of the slots $c$ $c$, the levers are in the position shown in Fig. 3, and the bar crosses the box at about the center thereof, as is shown in Fig. 1. This bar H carries the feeding presser plate or plunger I. This presser-plate, which has a superficial area about equal to that of the sliding vegetable-box, is attached to the cross-bar H by means of open cleats J J, secured to the back of the presser-plate. These cleats embrace the cross-bar, and, being longer than the bar is wide, permit the presser-plate to have a reciprocating or sliding movement in relation to and upon the cross-bar. The front or working face of the presser-plate is preferably slightly concave, in order to retain a firmer hold upon the contents of the box.

When the lever-arms are in the vertical position shown in Fig. 2, the presser-plate is held up out of the way, leaving the box open and ready to receive the vegetables to be cut. The levers are then depressed, thus bringing the working-face of the presser-plate against the contents of the box. When in this position the box is moved back and forth by means of the handle G and downward pressure upon the contents of the box, thus keeping the contents at all times in contact with the cutting-knives until the entire contents are cut or sliced. The cross-bar is usually mounted in the levers considerably nearer to the pivots thereof than to the handle, whereby an amount of leverage is obtained sufficient to easily keep the contents of the box in contact with the knives. The cross-bar being rotatively mounted in the levers enables the presser-plate to be brought at all times squarely against the contents of the sliding box, and the sliding connection between the presser-plate and the cross-bar enables the presser-plate to maintain its proper position in the box, whatever may be the position of the cross-bar in the slots $c\ c$.

Among the advantages of this cutter may be mentioned that it enables the vegetables to be sliced in a rapid, efficient, and uniform manner without necessitating handling the vegetables during the process of cutting, and thus avoiding the danger of cutting the hands of the operator, the box can be filled to its full capacity, the feeding presser-plate constitutes a cover therefor, and the cutting operation can be then continued until the entire contents are cut, and, owing to the simplicity of the construction, all the parts can be easily separated for the purpose of cleaning.

Having thus described my invention, what I claim as new, and desire to secure by Letters Patent, is—

1. In a vegetable cutter or slicer, a base-plate provided with cutting-knives, and a vegetable-containing box, which slides back and forth on said base-plate, said box having slots in its sides, in combination with levers pivoted to said box, and a feeding presser-plate having journals adapted to operate within said slots and carried by said levers, substantially as set forth.

2. In a vegetable cutter or slicer, a sliding vegetable-box, levers pivoted thereto, and a handle connecting the free ends thereof, in combination with a cross-bar rotatively mounted in said levers, and a feeding presser-plate connected with said cross-bar by sliding connection, substantially as set forth.

3. In a vegetable cutter or slicer, a sliding vegetable-box, levers pivoted thereto, and a handle connecting the free ends of said levers, in combination with a cross-bar carried by said levers between their pivots and the handle and at a point nearer to the pivots than to the handle, and a feeding presser-plate carried by said cross-bar, substantially as set forth.

4. In a vegetable cutter or slicer, a sliding vegetable-box having its sides provided with open arc-shaped slots, levers pivoted exteriorly to the sides of said box, and an operating-handle connecting the free ends of said levers, in combination with a cross-bar rotatively mounted in said levers between their pivots and handle, which cross-bar travels in said slots, and a feeding presser-plate carried by said cross bar, substantially as set forth.

5. A base-plate provided with a central aperture and with knives, and a vegetable-containing box, which slides back and forth on said base-plate across said knives, in combination with levers pivoted to said box, an operating-handle connecting the free ends of said levers, a cross-bar rotatively mounted in said levers, and a feeding presser-plate within the box carried by said cross-bar and connected therewith by a sliding connection, substantially as set forth.

In testimony whereof I affix my signature in presence of two witnesses.

JOSEPH ALOYSIUS KIRK.

Witnesses:
A. J. McQUAIDE,
EMANUEL MEYER.